Oct. 14, 1930.   F. H. TWEED   1,778,612
AIR VALVE
Filed March 29, 1926
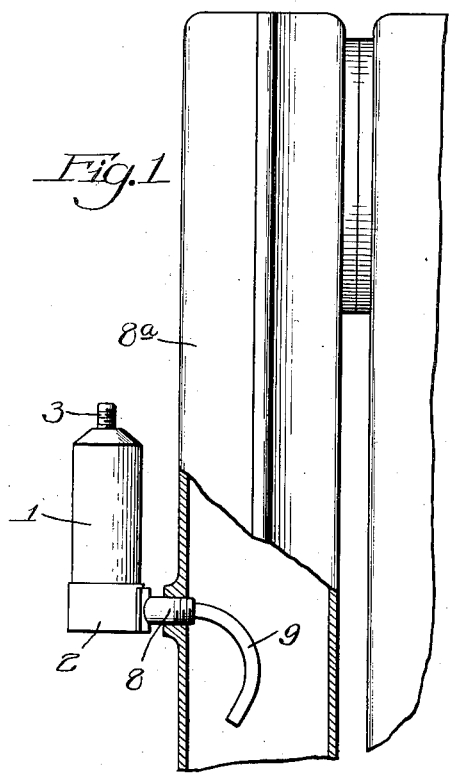
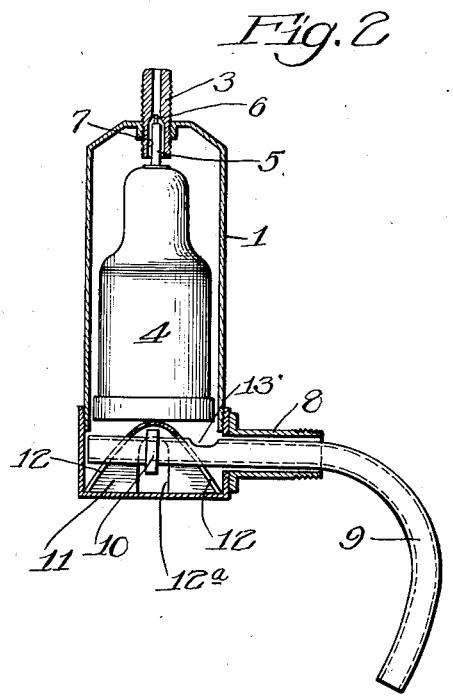
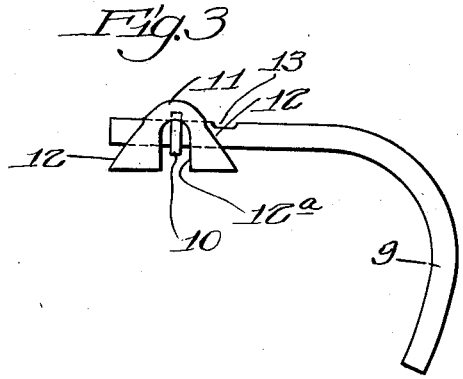
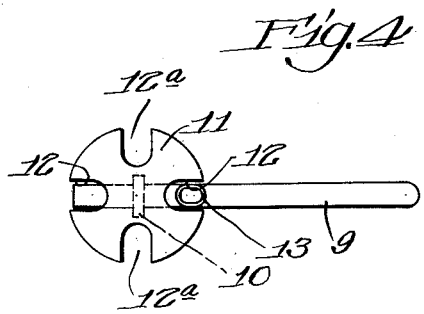

Patented Oct. 14, 1930

1,778,612

UNITED STATES PATENT OFFICE

FREDERICK H. TWEED, OF CHICAGO, ILLINOIS, ASSIGNOR TO DOLE VALVE COMPANY, OF CHICAGO, ILLINOIS, A CORPORATION OF ILLINOIS

AIR VALVE

Application filed March 29, 1926. Serial No. 98,183.

This invention relates to air valves and has for its object to provide a new and improved air valve particularly adapted for use on heating systems and which will insure the removal of the water in the valve. The invention has other objects which are more particularly pointed out in the accompanying description.

Referring now to the accompanying drawings:

Fig. 1 is a view showing one form of valve embodying the invention;

Fig. 2 is a sectional view through the valve;

Fig. 3 is a side view of the siphon holding piece and the siphon;

Fig. 4 is a plan view of the device shown in Fig. 3.

Like numerals refer to like parts throughout the several figures.

Referring now to the drawings:

The valve is provided with an outer casing 1, provided with a removable bottom portion 2. The casing 1 is provided with an adjustable hollow piece 3 which acts as an air outlet. Located in the casing 1 is a float 4 provided at the top with a stem 5 which has at its upper end a small guiding piece 6 which enters the passageway 7 of the piece 3. Connected with the removable bottom portion is a threaded projection 8 by means of which the valve is connected with the radiator 8ª or other device in connection with which it is used. A discharge tube 9 extends into the valve casing, the outer end thereof being bent downwardly so as to discharge water from the valve into the radiator. This discharge tube is provided with an enlargement 10 which fits into a holding device 11 connected with the bottom 2 of the casing. This holding device, as shown, is cone-shaped and is provided with openings 12 through which the tube 9 passes. This holding device may also be provided with openings 12ª at the opposite sides. In assembling the valve the tube 9 is placed in position and then the holding device which is separate from the valve casing is placed over it as shown, for example, in Figs. 4 and 3 and is then soldered or otherwise attached to the bottom 2 of the casing. When this fastening device is soldered or otherwise fastened to this casing the enlargement on the tube is confined by it so that the tube cannot be withdrawn. This does not interfere with the rotation and free movement of the tube. The inner end of the tube is open and water that collects in the casing will be discharged through this tube, the tube being a siphon, however, so as to insure the discharge of the water. The bottom 2 of the casing is preferably screw threaded to the remaining portion and after the parts are assembled, may be fastened thereto by soldering or any other desired means.

In the use of the valve, when water is forced into or accumulates in the casing the float 4 rises and the stem 5 closes the passageway 7 automatically so as to prevent the discharge of the water. When the water is discharged through the pipe 9 the float drops so as to open the passageway 7 so as to permit air to escape from the radiator. It will thus be seen that I have here a simple, cheap construction which is easily and cheaply manufactured and easily and cheaply assembled and which provides an efficient low cost air valve.

I have described in detail a particular construction embodying the invention but it is of course evident that the parts may be varied in many particulars without departing from the spirit of the invention as set forth in the claims hereto appended, and I therefore do not limit myself to the particular construction shown.

If desired the discharge tube 9 may have an opening 13 at a distance from its end. (See Figs. 3 and 4.) The enlargement 10 may be integral with the tube or separate therefrom, it being understood that this enlargement is sufficient to prevent the tube 9 from being pulled out of the holding device 11.

I claim:

1. An air valve comprising a casing, a removable bottom for said casing, a hollow threaded projection connected with said removable bottom, a bent tube having its straight portion extending into the bottom of the casing through said hollow threaded projection, an enlargement on said tube and a bent holding piece surrounding said enlargement and having openings at opposite sides through which the tube projects, said holding piece being separate from the bottom of the casing but fastened thereto.

2. An air valve comprising a casing, a removable bottom therefor, a bent tube extending into said bottom and provided with an enlargement on the exterior thereof, said tube projecting beyond said enlargement on both sides thereof, and a holding device connected with the bottom of the casing which fits over said enlargement and a portion of said tube and holds said enlargement so as to prevent the removal of the tube.

3. An air valve comprising a casing, a removable bottom therefor, a bent tube extending into said bottom and provided with an enlargement and a holding device separate from but connected with the bottom of the casing into which the end of the tube projects, said holding device being looped over said enlargement so as to prevent the removal of the tube, said holding device loosely enclosing said enlargement so as to permit the rotation of the tube.

4. An air valve comprising a casing, a removable bottom therefor, a bent tube projecting into said bottom of the casing, an enlargement on said tube, said tube projecting in opposite directions on both sides of said enlargement and means separate from the casing into which the enlargement and a portion of the tube on each side of said enlargement is received for enclosing and holding said enlargement so as to prevent the tube from being withdrawn from the casing but permit its free rotation.

5. A valve comprising a casing, a hollow adjustable piece at the top of said casing projecting partly into and partly outside of the casing, a float in said casing, a stem for said float, a small guiding piece at the end of said stem adapted to project into the hollow of said adjustable piece, a bottom for the casing separate therefrom and adapted to be connected therewith, a bent pipe projecting into said bottom, an enlargement on said pipe and a cone-shaped holding device inclosing said enlargement and a part of the pipe and fastened to the bottom of said casing said cone shaped holding device acting as a support for said float.

Signed at Chicago county of Cook and State of Illinois, this 13th day of March, 1926.

FREDERICK H. TWEED.